INVENTOR.
CLAUDIUS F. KOTILA
BY Hamilton & Cook
ATTORNEYS

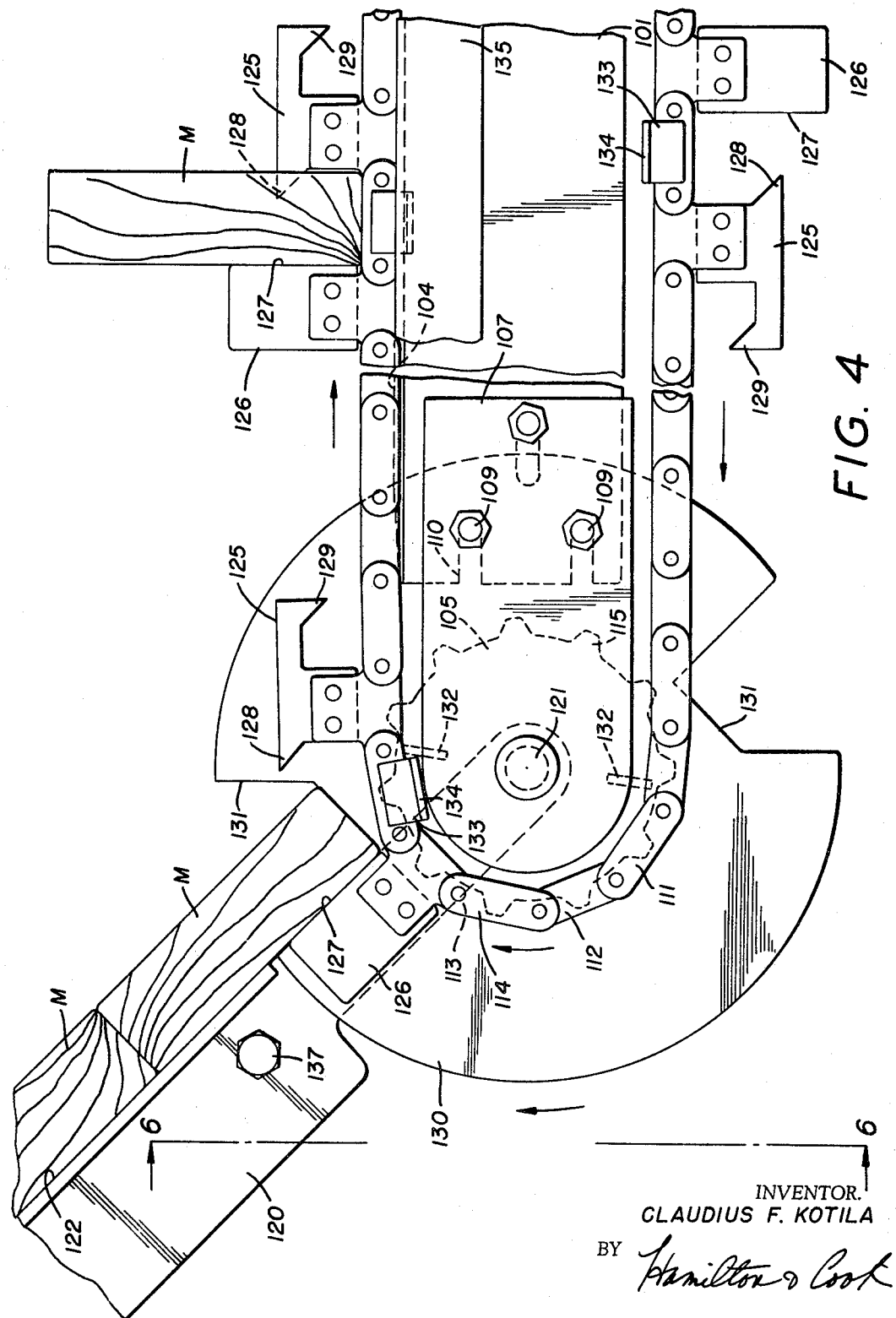

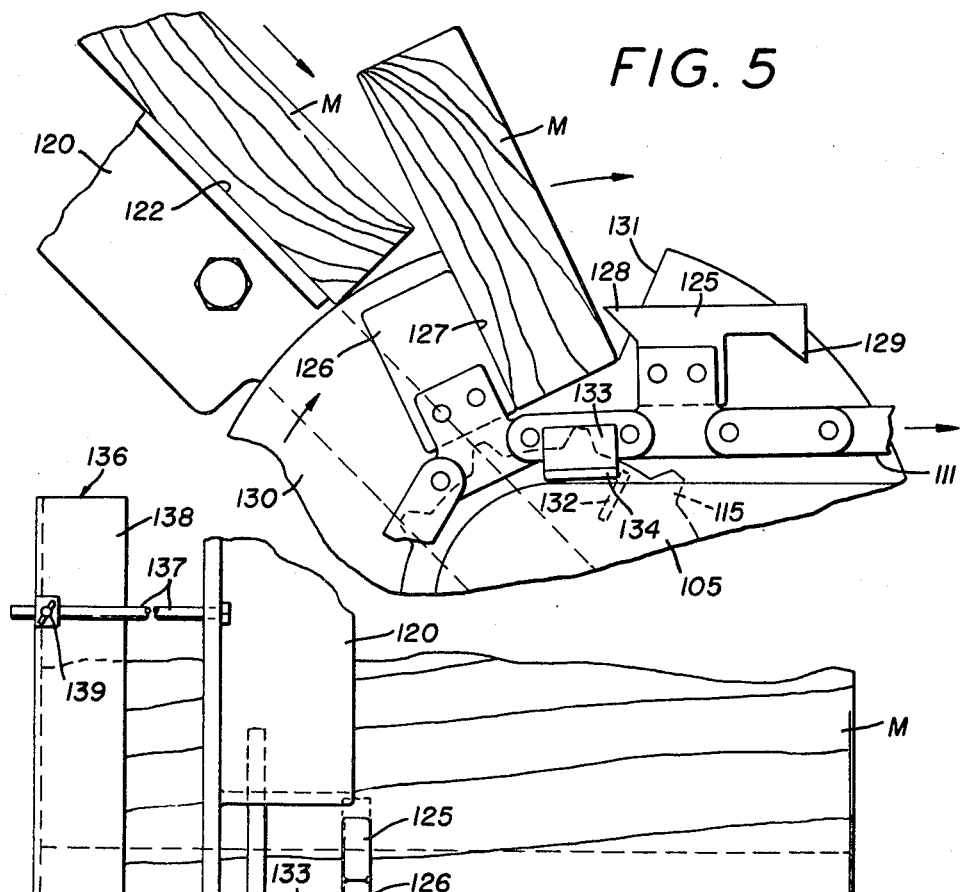
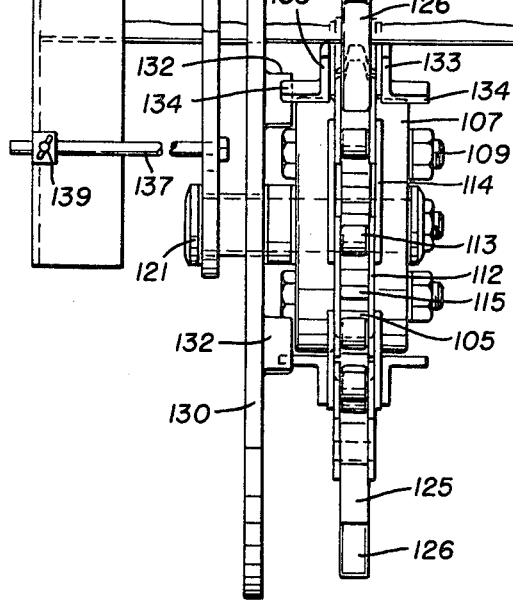

June 18, 1968  C. F. KOTILA  3,388,727
MULTIPLE-CUT APPARATUS
Filed July 9, 1965  6 Sheets-Sheet 6

INVENTOR.
CLAUDIUS F. KOTILA
BY Hamilton & Cook
ATTORNEYS

United States Patent Office 3,388,727
Patented June 18, 1968

3,388,727
MULTIPLE-CUT APPARATUS
Claudius F. Kotila, Mansfield, Ohio, assignor to Good-Ko Industries, Inc., Flint, Mich., a corporation of Michigan
Filed July 9, 1965, Ser. No. 470,795
13 Claims. (Cl. 143—36)

ABSTRACT OF THE DISCLOSURE

A multiple-cut sawing apparatus which includes a base frame, and a pair of plural head saw carriages attached to a frame. At least one of the carriages is adjustable toward and away from the other of the carriages on the frame; a pair of saw assemblies is associated with each of the carriages and each saw is separately and selectively rotatable whereby the angle of the cut made by a pair of saws is adjustable in relation to woodstock passing between the carriages. One of the saws in each pair is lineally extendable and retractable so that the position of the apex of the cut is adjustable. Ways deliver the stock between the spaced apart carriage stations.

---

One of the primary uses of wood in its natural state after conversion to plank form is in the building industry. Although design variations dictate that some members be precisely measured and cut on the building site, large lots of identical components are frequently used in the construction of most buildings and other wooden structures. Due to the labor involved in measuring, marking, and sawing components on the building site and the material loss when errors are made, there is appreciable economic advantage in pre-cutting or prefabricating large numbers of identical components or members. For a number of years, there has been a pronounced tendency in the building industry to pre-cut conventional members having square or other simple end constructions; however, components with angled or beveled end cuts, which are the most difficult and laborious to form by hand operated saws on the building site, are still normally fabricated by conventional hand operations.

Recently, sawing apparatus has been introduced on the market which is capable of making two angular cuts at either end of a wood member by the use of two pairs of laterally spaced circular saw members. Each pair of saws is normally rotatable about a common pivot axis which is coincident with a chord of both saw blades, and the pivot axes at either end are mutually parallel and at identical levels with respect to the surface of the material conveyor. In these devices the line of merger of the cut or apex at either end coincides with the respective common pivot axis and the position of the pivot axis with respect to the material height is adjusted by the use of inserts which vary the vertical height of the surface of the material conveyor.

A primary problem in this type of apparatus is that separate inserts, usually several in number, are required for each variation in the position of the pivot axes with respect to the material height. A further problem with this type of sawing device is that the lines of merger of the cuts at either end or the apexes of the material are not independently adjustable over the height of the material, rather they lie in a plane which is at all times parallel to the surface of the material conveyor. A further problem with many of these saws is the lack of a simple device which will securely hold a plurality of material sizes during the sawing operation, when the material is inserted at different levels.

Accordingly, a principal object of the present invention is to provide an improved sawing apparatus capable of making two selectively positioned angle cuts at both ends of wood members passed therethrough.

Another object of this invention is to provide apparatus which can rapidly mass produce any desired number of identical pre-cut wood members.

A further object of the invention is to provide a machine which is capable of making two angle cuts at either end of wood members passed therethrough and in which the angularity of the cuts may be varied while maintaining the same overall length of the wood members from the apex at one end to the apex at the other end.

Still another object of the invention is to provide apparatus wherein the location of the apex at either end may be independently varied over the height of the material, while maintaining the overall length of the material constant.

A further object of the invention is to provide apparatus which will sequentially feed raw wood material to the sawing device at a predetermined speed and in the proper orientation for processing.

Another object of the invention is to provide a wood material feed device which will receive material from a hopper, rigidly hold the material in a positive safety grip during the sawing operation and subsequently discharge it at a predetermined position.

Various other objects and advantages will appear from the following description taken in conjunction with the attached drawings, and the novel features will be pointed out hereinafter in conjunction with the appended claims.

In the drawings:

FIG. 4 is an enlarged fragmentary side elevation of the material feed device taken substantially on line 4—4 of FIG. 2 and showing the receipt of material from the storage hopper and the positive safety grip employed during the sawing operation;

FIG. 5 is a fragmentary view of the material feed device of FIG. 4 after a slight travel of the conveying apparatus from the position of FIG. 4;

FIG. 6 is an enlarged front elevation of the material feed device taken substantially on line 6—6 of FIG. 4;

Figure 1:
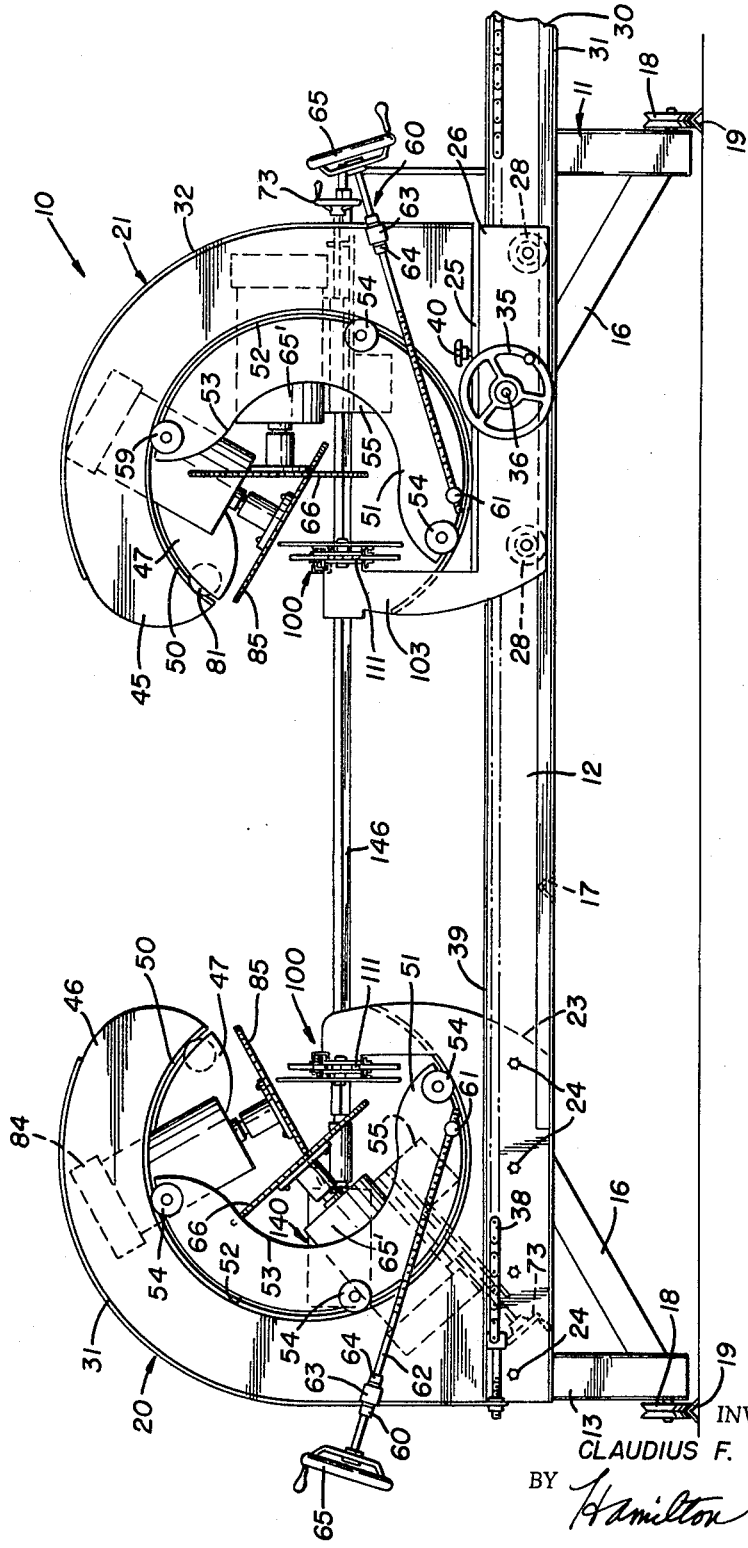
FIG. 1 is a front elevation of a multiple-cut sawing apparatus embodying the principles of the present invention.
Figure 2:
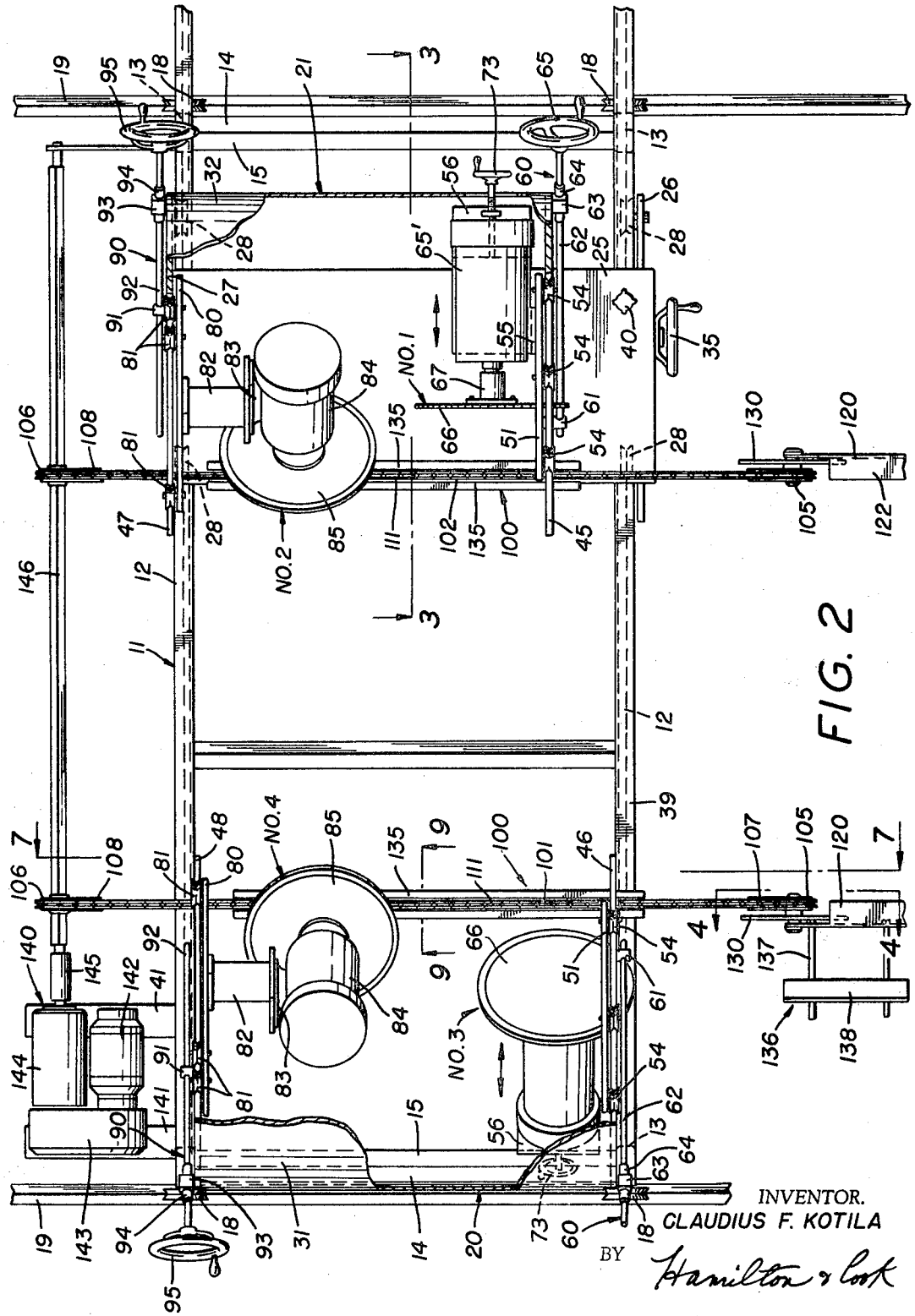
FIG. 2 is a top plan view of the sawing apparatus depicted in FIG. 1, with the covers or shields for the saws broken away.

Referring now to the drawings and particularly to FIGS. 1 and 2, the multiple-cut sawing apparatus is generally indicated by the numeral 10. The operating components are attached to and supported by a broad, relatively low rectangular frame, generally indicated by the numeral 11. The primary components of the frame 11 are the two U-beams 12 which run longitudinally the length of the sawing apparatus 10. At either end, the longitudinal beams 12 are supported by substantially vertical beams or columns 13, which may be attached by welding, or other suitable means. Lateral spacing and attachment of the longitudinal beams 12 at either end is provided by a pair of crossed beams 14 and 15 which are each attached to the top of one column 13 and the bottom of the adjacent column at the same end. Depending upon the particular size and strength requirements, angle braces 16 and transverse braces 17 may be added as necessary. All frame members are joined by welding, or otherwise conventionally attached, in such a manner that the entire frame 11 is a rigid support unit.

If desired, the entire sawing apparatus 10 may be made mobile to alleviate the problem of sawdust buildup and to facilitate its collection and removal. This can be accomplished by mounting conventional V-wheels 18 on the frame 11 at the lower portion of the vertical columns 13. Angle irons 19 may then be mounted in parallel relation on the ground or floor to provide a suitable track for transverse movement of the sawing apparatus 10. Other conventional wheel units of the type designed for heavy equipment would be equally adaptable.

The longitudinal beams 12 of frame 11 support two substantially identical carriages which mount the saws. A fixed carriage assembly 20 is depicted to the left in FIGS. 1 and 2, and a movable carriage assembly 21 which travels on longitudinal beams 12 is shown to the right in these figures. The fixed carriage 20 has downwardly projecting attachment flanges 23 which are rigidly attached to the interior extremities of the longitudinal beams 12 by a series of bolts 24, or other suitable fasteners.

The movable carriage assembly 21 has a flat transverse base or bed 25 with downwardly projecting frame members 26 and 27 which exteriorly straddle the longitudinal beams 12. V-wheels 28 are mounted near the lower longitudinal extremities of each of the frame members 26 and 27. The two V-wheels 28 on each frame member 26 and 27 are transversely aligned to engage V-rails 30 attached to the lower webs 31 of the U-shaped longitudinal beams 12 (FIGS. 1 and 3) and running substantially the entire length thereof, except in the area below fixed carriage 20. The V-wheels 28 may be mounted on conventional roller or ball bearings to provide for smooth, easy traverse of movable carriage 21 along the V-rails 30. If desired, both carriages 20, 21 may be provided with outer covers 31 and 32 which serve as shields for the saws and protect the operator from the discharge of wood particles.

Figure 3:
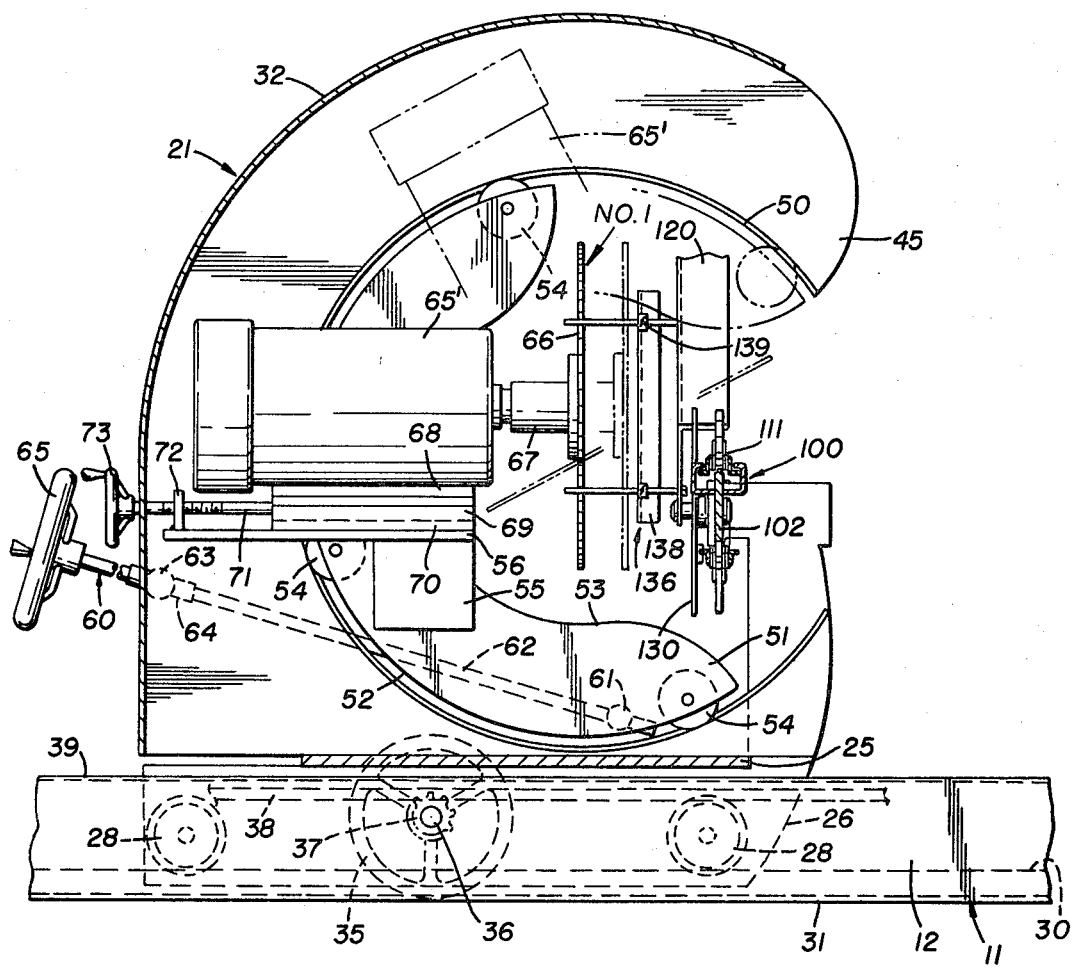
FIG. 3 is an enlarged sectional view of the carriage portion of the sawing apparatus taken substantially on line 3—3 of FIG. 2 and showing the details of the mounting of the forward saw, with the relative orientation of the rear saw being shown in phantom lines.

The movable carriage 21 is positioned along the longitudinal beams 12 in relation to the fixed carriage 20 depending upon the length of the material and the setting of the saws, as hereinafter detailed. This positioning function is accomplished by the handwheel 35 located on the front of the frame member 26 which is keyed to a shaft 36 which rotates a sprocket 37 located between frame member 26 of movable carriage 21 and longitudinal beam 12 (FIG. 3). The sprocket 37 engages a linear chain 38 which is suspended below the upper web 39 of the front longitudinal beam 12. In order to preclude any possibility of travel movable carriage 21 during operation of the saws, a hand operated screw 40 may be provided in the carriage bed 25 to extend therethrough and frictionally engage the top surface of upper web 39.

In order to provide the two commonly required angular cuts in each end of wooden building members, the carriages 20, 21 each contain a pair of circular saws arranged in tandem. Movable carriage 21 has a forward saw assembly No. 1 and a rear saw assembly No. 2 (FIG. 2); fixed carriage 20 has a forward saw assembly No. 3, identical to saw assembly 1, and a rear saw assembly No. 4, identical to saw assembly No. 2. Each saw assembly is rotationally mounted within its respective carriage by C-frame members 45, 46, 47, and 48 which house saw assemblies Nos. 1, 2, 3, and 4 respectively. The interior edge 50 of the C-frame members lies on the circumference of a circle and is tapered to a V-shape at its radially inner extremity.

Since saw assemblies Nos. 1 and 3 are identical in all respects including their mounting, only saw assembly No. 1 will be described with reference to FIGS. 1–3; however, the same structure and comments supply to saw assembly No. 3. Saw assembly No. 1 is rotatably mounted within the C-frame 45 on a yoke 51 having an outer edge 52 conforming to the circumference of a circle of slightly smaller radius than the interior edge 50 of the C-frame 45. Yoke 51 preferably encompasses substantially a semi-circle and has an arcuate inner edge 53 which leaves a large area near the radial center open for free passage of the material workpiece. A series of V-wheels or guides 54, preferably three for a substantially semi-circular yoke, are positioned near the outer edge 52 to matingly engage the V-shaped interior edge 50 of the C-frame 45.

Saw assembly No. 1 is rigidly fastened to yoke 51 by means of an angular plate 55 having one leg secured, as by welding, to the surface of yoke 51 and a second perpendicular leg or base 56 which serves as a platform for saw assembly No. 1. The yoke 51 is rotatably positioned within the C-frame 45 by means of the manual control linkage, generally indicated by the numeral 60. An interiorly bored and threaded block 61 is pivotally attached to the yoke 51 and receives a shaft 62, threaded along its lower portion, which extends along the surface of the yoke 51 and C-frame 45. The smooth upper end of the shaft 62 is retained in a pivoted block 63 and collar 64 in which is freely rotates. A handwheel 65 keyed to the shaft 62 provides for manual rotation, thereby causing the threaded block 61 to traverse the shaft 62 and selectively rotationally position the yoke 51 within C-frame 45.

In addition to their rotational capability, saw assemblies Nos. 1 and 3 are also translatable on the perpendicular leg or base 56 of the angular attaching plate 55. Referring now particularly to FIG. 3, saw assembly No. 1 has a motor 65' to which is attached a circular saw blade 66 by means of a suitable coupling 67. A motor base 68 with a downward projection 69 is provided to engage a slotted projection 70 on the upper surface of the leg 56 of plate 55. A shaft 71 is axially fixed but rotationally freely mounted in the motor base 68. Progressing longitudinally from the motor base 68, the shaft 71 is medially threaded in the area of an internally threaded guide block 72, which is attached to the upper surface of leg 56 of plate 55. Upon actuation of a handwheel 73 rotationally fixed on the shaft 71, the motor base 68, the motor 65', and the circular saw blade 66 are displaced longitudinally with respect to the plate 55 and the yoke 51 in the angular position depicted in FIG. 3.

As previously indicated, saw assemblies Nos. 2 and 4 are identical and mounted in the same manner. Therefore the following comments directed to saw assembly No. 2 are equally applicable in all respects to saw assembly No. 4. Since the desired adjustment flexibility of the apparatus is made possible by the rotation and translation capability of saw assemblies Nos. 1 and 3, saw assemblies Nos. 2 and 4 are provided only with a rotational capability.

Referring now to FIGS. 1 and 2, saw assembly No. 2 is rotatably mounted within C-frame member 47 on a yoke 80, which is similar in all respects to yoke 51 of saw assemblies Nos. 1 and 3. A series of V-wheels or guides 81 are positioned near the outer edge of yoke 80 to matingly engage the circular interior edge of C-frame member 47. Saw assembly No. 2 is rigidly attached to yoke 80 by means of an angular plate 82 having one leg secured, as by welding, to the surface of the yoke 80 and a second leg secured in a similar manner to the motor mounting plate 83. A standard motor 84 linked to the saw blade 85 is firmly connected to the motor mounting plate 83 to maintain the circular saw blade in fixed relation to the yoke 80.

The yoke 80 is rotatably positioned within the C-frame 47 by means of a manual control linkage, generally indicated by the numeral 90. An interiorly bored and threaded block 91 is pivotally attached to the yoke 80 and receives a shaft 92, threaded along its lower portion, which extends along the surface of the yoke 80 and C-frame member 47. The smooth upper end of shaft 92 is retained in a pivoted block 93 and collar 94 in which it freely rotates. A handwheel 95 keyed to the shaft 92 provides for manual rotation, thereby causing the threaded block 91 to traverse the shaft 92 and selectively rotationally position the yoke 80 within C-frame 47.

Figure 8:
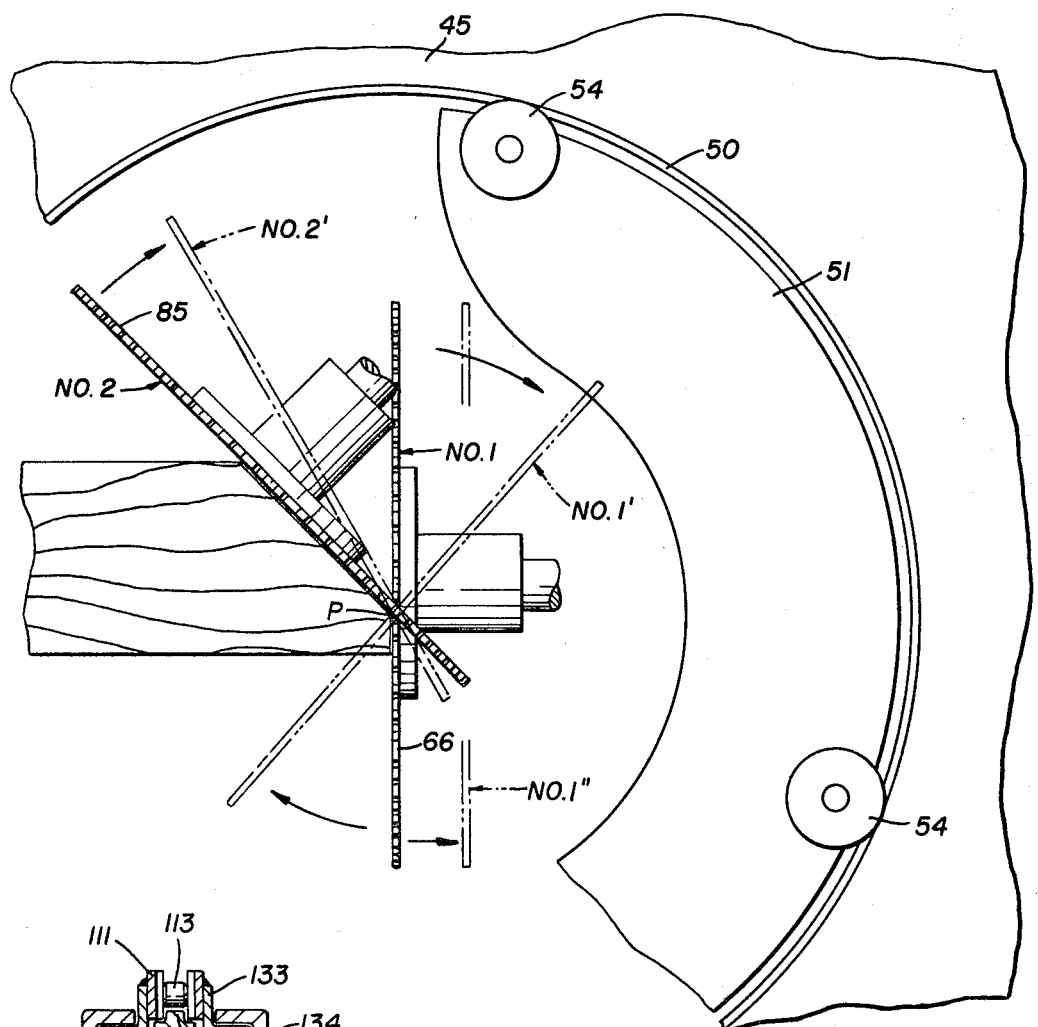
FIG. 8 is an enlarged fragmentary view of the carriage portion of the sawing apparatus of FIG. 1 demonstrating the rotation of both saws about a common pivot point and the translation of the forward saw.

The above described selective positioning of the saw assemblies is best seen in FIG. 8 wherein the various capabilities are exemplified. The C-frame members associated with either carriage, such as C-frame members 45 and 47 of movable carriage 21, are mounted in parallel planes in such a manner that a line through the center of the circles defining the inner edges is perpendicular to both C-frame members. Such a line would be positioned as shown by the point marked P in FIG. 8. When the yoke 51 of saw assembly No. 1 is rotated within C-frame member 45, the saw blade 66 rotates about the "pivot" point P from the position depicted as No. 1 to No. 1'. A similar rotation of saw assembly No. 2 produces an angular displacement of saw blade 85 from the exemplary position No. 2 to No. 2'. In addition to rotation, there is provided a translation of saw assembly No. 1 with relation to its C-frame 45 depicted by the displacement of saw blade 66 from position No. 1 to No. 1". However, regardless of any translation, saw assembly No. 1 continues to rotate about the same pivot point P.

Referring again generally to FIGS. 1–3, the saw assemblies are supplied with a continuous input of raw material by a material feed device, generally indicated by the numeral 100. Material is supplied in proper orientation to achieve the desired cut and at a rate which does not overload the saw assemblies. The feed device 100 has two identical conveyor frame members 101, 102 which are precisely positioned for proper input of material to fixed carriage 20 and movable carriage 21, respectively. Frame member 101 is rigidly attached to upwardly projecting supports 103 of C-frame members 46 and 48. Frame member 102 is similarly attached to upwardly projecting supports 103 of frame members 26 and 27 of movable carriage 21. The frame members 101, 102 may be provided with upper indented surfaces or tracks 104.

Figure 7:
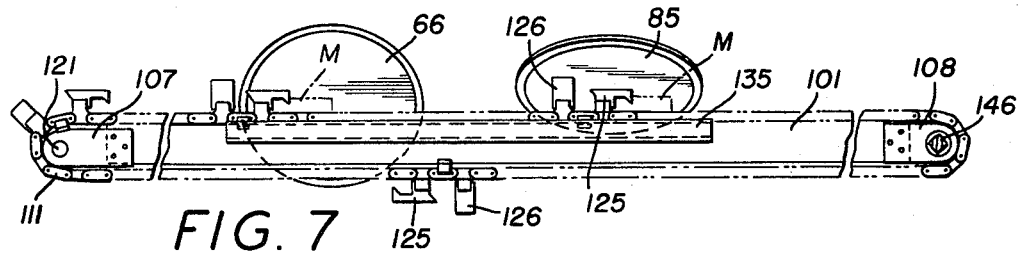
FIG. 7 is a side elevation of the material feed device taken substantially on line 7—7 of FIG. 2 with the material being gripped in a different manner from that depicted in FIGS. 4 and 5.

Referring now to FIGS. 2 and 7, each conveyor frame member 101, 102 has a front sprocket 105 and a rear sprocket 106 mounted on plates 107 and 108, respectively, which are removably attached to the frame members 101, 102 by bolts 109 or other temporary fastening means. The plates are preferably provided with slots 110 which allow variation in the position of the plates longitudinally with respect to frame members 101, 102 to facilitate adjustment and removal of a conveyor chain 111 which runs on the sprockets 105, 106 (FIG. 4). As best seen in FIGS. 4 and 6, the conveyor chain 111 is of conventional construction having a series of links 112 mounting pairs of spaced rollers 113. Adjacent links 112 are spaced and joined by connecting clips 114, thereby providing an endless conveyor chain which smoothly meshes with teeth 115 appropriately spaced on the sprockets 105, 106.

The wood material to be cut is stacked on supply hoppers 120 which are rotatably adjustably mounted on shafts 121 about which the sprockets 105 and 106 rotate. The hoppers 120 have an upper surface 122 which is suitably vertically oriented to provide a gravity feed of the wood material M to the conveyor chain 111. Spaced along the conveyor chain 111 at predetermined intervals are adjacent links 112 having outward projections or dogs adapted to receive and retain the material M. Each pair of links have a leading dog 125 in the direction of rotation of the conveyor chain 111 and a trailing dog 126 (FIG. 4). The trailing dogs 126 have a flat rectangular surface 127 which seats against or abuts the material M; the leading dogs 125 have sharp rearward projections or spikes 128 which embed in the material M and firmly retains it during travel on the conveyor chain 111 when the material M is positioned so that it stands upright as seen in FIG. 4. At the forward end of the leading dogs 125 there is a downward projection or spike 129 which retains the material when it is laterally positioned on the conveyor chain 111 as seen in FIG. 7.

The material M is transferred from the hopper 120 to the conveyor chain 111 and positioned between leading dog 125 and trailing dog 126 by means of a feed wheel 130 which is rotatably mounted on the shaft 121 between the sprocket 105 and the hopper 120. The feed wheel 130 has a plurality of identical radially inwardly directed notches 131 which are adapted to receive the material M and seat it on the conveyor chain 111. The rotation of the feed wheel 130 is controlled by a series of pickup lugs 132, one for each notch 131, which extend axially inwardly toward the sprocket 105. The connecting clips 114 which join the links 112 having the dogs 125, 126 are fitted with L-shaped actuating plates 133 in such a manner that one leg 134 extends axially outwardly to engage the pickup lugs 132.

The operation of the feed wheel 130 is best seen by reference to FIGS. 4 and 5. When a notch 131 of the feed wheel 130 is aligned with the hopper 120, the lower piece of material M slides into the notch 131. As the conveyor continues to move, the plate 133 maintains contact with the pickup lug 132 to rotate the feed wheel 130. Thus, when the material piece M seated in the notch 131 is rotated out from under the next material piece M in the hopper, the outer periphery of the feed wheel 130 restricts the fall of this piece (FIG. 5), until the next notch 131 is rotated into receiving position under the hopper 120 by a subsequent rotation of the next pickup lug 132 by a following actuating plate 133. In order to laterally place the material M on the conveyor chain 111, it is necessary to substitute a feed wheel 130 having appropriately shaped notches 131 and suitably positioned pickup lugs 132; however, the same principles of operation are employed.

Figure 9:
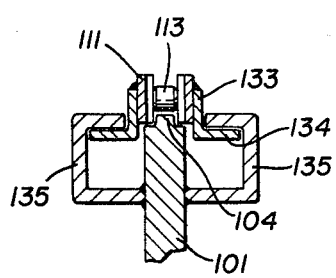
FIG. 9 is an enlarged sectional view of the details of the conveyor hold-down device taken substantially on line 9—9 of FIG. 2.

Since the material M is securely held on the conveyor chain 111 by the spikes 128 or 129 on leading dog 125, the application of torsional or lifting forces by the saw blades may tend to cause the conveyor chain 111 to leave its track 104 on the upper surface of the conveyor frame members 101, 102. To eliminate this problem, the frames 101, 102 are fitted with channel brackets 135 (FIG. 9), which extend upwardly and enclose the projecting legs 134 of plate 133. Thus, the conveyor chain 111 is securely retained on its track 104 despite any forces which may be imparted to the material M by the saw blades. The positive gripping of the material by the dogs 125, 126 and the positive retention of the conveyor chain 111 on its track provide improved precision in the finished material cut and greater safety in operation.

The material M is adjustably positioned longitudinally of the frame 11 for insertion into the saw assemblies by means of an alignment attachment, generally indicated by the numeral 136 in FIGS. 2, 3, and 6. A pair of rods 137 extend through and project laterally of the supply hopper 120 to serve as the main supports of alignment attachment 136. A T-shaped guide plate 138, provided with holes to receive the rods 137, is selectively positioned along the length of the rods. Hand adjustable fasteners 139 may be threaded through the guide plate 138 to frictionally engage rods 137 and maintain the guide plate in any desired position.

Referring now to FIGS. 1 and 2, the conveyor chains 111 are powered by a drive assembly 140 located on a platform 141 at the rear of the fixed carriage 20, or in any other convenient position. The electric motor 142 is connected to reduction gear 143 and a worm gear 144, or other suitable mechanical linkages to reduce the angular velocity of the output coupling 145. The coupling 145 is attached to a shaft 146 on which the rear sprockets 106 of feed device 100 are mounted. If desired, suitable provision may be made to selectively vary the angular velocity of the shaft 146 to provide different rates of material input to the conveyor.

In preparation for a normal run of a plurality of identical wooden building components, the movable carriage 21 is positioned along the longitudinal beams 12 of frame 11 by handwheel 35 until the pivot points of the saw assemblies of fixed carriage 20 and movable carriage 21 are spaced the length of the finished material or building component. If desired, suitable calibration may be provided to facilitate accurate placement of movable carriage 21. The saw assemblies in the carriages 20, 21 may be rotated to make any desired angular cut by adjustment of the handwheels 65, 95 located on the back of the carriages.

When it is desired to make a cut in which the apex of the cut at either or both ends does not coincide with the pivot axis of the saw assemblies, the saw assemblies Nos. 1 and 2 are appropriately translated, as depicted by position No. 1″ in FIG. 8. After translation adjustments are made, it is necessary to readjust movable carriage 21 by handwheel 35 to maintain the desired material length. The rotation and translation functions may also be suitably calibrated as an aid to the operator. When all adjustments of the saw assemblies and movable carriage are complete, the conveyor drive assembly 140 is energized and the material to be cut is loaded into the supply hopper 120 and longitudinally positioned against alignment attachment 136 for delivery by the feed device 100 to the saw assemblies.

A preferred embodiment of the invention has been and described in sufficient detail to enable one skilled in the art to practice the invention. Since various modifications in details, materials and arrangements of parts are within the spirit of the invention herein disclosed and described, the scope of the invention should be limited solely by the scope of the claims hereinafter attached.

What is claimed is:

1. A multiple-cut sawing apparatus for building materials comprising, a supporting frame, a fixed carriage attached to said supporting frame, a movable carriage selectively translatable longitudinally of said supporting frame, a pair of saw assemblies selectively rotatably mounted about a common pivot axis in said fixed carriage and in said movable carriage, one of said saw assemblies of each of said fixed and movable carriages being selectively translatable with respect to its pivot axis, whereby the apex of the cut made by either pair of saws may be selectively vertically positioned, and material feed means laterally traversing said supporting frame to supply building material to said pairs of saw assemblies.

2. A multiple-cut sawing apparatus for building materials comprising, a supporting frame, a fixed carriage attached to said supporting frame, a movable carriage selectively translatable longitudinally of said supporting frame, a pair of saw assemblies in said fixed carriage and in said movable carriage, yokes mounting each saw assembly for selective rotation of each said pair of saw assemblies about a common pivot axis, one of said saw assemblies of each of said fixed and movable carriages being selectively translatable with respect to its pivot axis, whereby the apex of the cut made by either pair of saws may be selectively vertically positioned, and material feed means laterally traversing said supporting frame to supply building material to said pairs of saw assemblies.

3. A multiple-cut sawing apparatus for building materials comprising, a supporting frame, a fixed carriage attached to said supporting frame, a movable carriage selectively translatable longitudinally of said supporting frame, a pair of C-frame members disposed in said fixed carriage and in said movable carriage, a pair of yokes for each said pair of C-frame members selectively rotatably mounted about a common pivot axis, a saw assembly attached to each said yoke, one of said saw assemblies of each of said fixed and movable carriages being selectively translatable with respect to its pivot axis, whereby the apex of the cut made by either pair of saws may be selectively vertically positioned, and material feed means laterally traversing said supporting frame to supply building material to said pairs of saw assemblies.

4. A multiple-cut sawing apparatus for building materials comprising, a supporting frame, a fixed carriage attached to said supporting frame, a movable carriage selectively translatable longitudinally of said supporting frame, a pair of saw assemblies in said fixed carriage and in said movable carriage, yokes mounting each saw assembly for selective rotation of each said pair of saw assemblies about a common pivot axis, one of said saw assemblies of each of said fixed and movable carriages being selectively radially translatable with respect to its mounting yoke, whereby the apex of the cut made by either pair of saws may be selectively vertically positioned, and material feed means laterally traversing said supporting frame to supply building material to said pairs of saw assemblies.

5. A multiple-cut sawing apparatus for building materials comprising, a supporting frame, a fixed carriage attached to said supporting frame, a movable carriage selectively translatable longitudinally of said supporting frame, a pair of C-frame members disposed in said fixed carriage and in said movable carriage, a pair of yokes for each pair of C-frame members selectively rotatably mounted about a common pivot axis, a saw assembly attached to each said yoke, one of said saw assemblies of each of said fixed and movable carriages being selectively radially translatable with respect its mounting yoke, whereby the apex of the cut made by either pair of saws may be selectively vertically positioned, and material feed means laterally traversing said supporting frame to supply building material to said pairs of saw assemblies.

6. A multiple-cut sawing apparatus for building materials comprising, a supporting frame, a fixed carriage attached to said supporting frame, a movable carriage selectively translatable longitudinally of said supporting frame, a pair of saw assemblies selectively rotatably mounted about a common pivot axis in said fixed carriage and in said movable carriage, one of said saw assemblies of each of said fixed and movable carriages being selectively translatable with respect to its pivot axis, whereby the apex of the cut made by either pair of saws may be selectively vertically positioned, and material feed means laterally traversing said supporting frame to supply building material to said pairs of saw assemblies at a fixed vertical level.

7. A multiple-cut sawing apparatus for building materials comprising, a supporting frame, a movable carriage selectively translatable along said supporting frame, a pair of saw assemblies selectively rotatably mounted about a common pivot axis in said carriage, one of said saw assemblies of said carriage being selectively translatable with respect to its pivot axis, whereby the apex of the cut made by said pair of saw assemblies may be selectively vertically positioned, and material feed means supplying building materials to said saw assemblies.

8. A multiple-cut sawing apparatus for building materials comprising, a supporting frame, a movable carriage selectively translatable along said supporting frame, a pair of C-frame members disposed in said carriage, a yoke mounted within each said C-frame and selectively rotatable about a common pivot axis, a saw assembly attached to each said yoke, one of said saw assemblies of said carriage being selectively translatable with respect to its pivot axis, whereby the apex of the cut made by said pair of saw assemblies may be selectively vertically positioned, and material feed means supplying building materials to said saw assemblies.

9. A multiple-cut sawing apparatus for building materials comprising, a supporting frame, a movable carriage selectively translatable along said supporting frame, a pair of C-frame members disposed in said carriage and having a radially interior edge conforming to an arc of a circle, a yoke mounted within each said C-frame member and having guide means for rotational travel about said interior edge of said C-frame members, a saw assembly attached to each said yoke, one of said saw assemblies of said carriage being selectively translatable with respect to its pivot axis, whereby the apex of the cut made by said pair of saw assemblies may be selectively vertically positioned, and material feed means supplying building materials to said saw assemblies.

10. A multiple-cut sawing apparatus for building materials comprising, a supporting frame, a movable carriage selectively translatable along said supporting frame, a pair of C-frame members disposed in said carriage and having a radially interior edge conforming to an arc of a circle, a yoke mounted within each said C-frame member and having guide means for rotational travel about said interior edge of said C-frame members, a control linkage selectively rotationally positioning each said yoke within its C-frame member, a saw assembly attached to each said yoke, one of said saw assemblies of said carriage being selectively translatable with respect to its pivot axis, whereby the apex of the cut made by said pair of saw assemblies may be selectively vertically positioned, and material feed means supplying building materials to said saw assemblies.

11. A multiple-cut sawing apparatus for building materials comprising, a supporting frame, a movable carriage selectively translatable along said supporting frame, a pair of C-frame members disposed in said carriage, a yoke mounted within each of said C-frame member and selectively rotatable about a common pivot axis, a saw assembly attached to each said yoke, one of said saw assemblies of said carriage being movably attached to its yoke for selective radial placement with respect to its pivot axis, whereby the apex of the cut made by said pair of saw assemblies may be selectively vertically positioned, and material feed means supplying building materials to said saw assemblies.

12. A multiple-cut sawing apparatus for building materials comprising, a supporting frame, a movable carriage selectively translatable along said supporting frame, a pair of C-frame members disposed in said carriage and having a radially interior edge conforming to an arc of a circle, a yoke mounted within each said C-frame member and having guide means for rotational travel about said interior edge of said C-frame members, a control linkage selectively rotationally positioning each said yoke within its C-frame member, a saw assembly attached to each said yoke, one of said assemblies of said carriage being movably attached to its yoke for selective radial placement with respect to its pivot axis, whereby the apex of the cut made by said pair of saw assemblies may be selectively vertically positioned, and material feed means supplying materials to said saw assemblies.

13. A multiple-cut sawing apparatus for building materials comprising, a supporting frame, a movable carriage selectively translatable along said supporting frame, a pair of C-frame members disposed in said carriage and having a radially interior edge conforming to an arc of a circle, a yoke mounted within each said C-frame member and having guide means for rotational travel about said interior edge of said C-frame members, a control linkage selectively rotationally positioning each said yoke within its C-frame member, a saw assembly attached to each said yoke, one of said saw assemblies of said carriage being movably attached to its yoke for selective radial placement with respect to its pivot axis, whereby the apex of the cut made by said pair of saw assemblies may be selectively vertically positioned, and material feed means supplying building materials to said saw assemblies at a fixed vertical level.

References Cited

UNITED STATES PATENTS

| 1,807,216 | 5/1931 | Johnson | 143—49 X |
| 2,377,139 | 5/1945 | Fraser. | |
| 2,917,089 | 12/1959 | Ennis | 143—38 X |
| 3,007,500 | 11/1961 | Halicki et al. | 143—38 X |
| 3,080,895 | 3/1963 | Mayo | 143—38 |
| 3,229,732 | 1/1966 | Mayo | 144—1 X |
| 3,283,637 | 11/1966 | Brenner et al. | 143—38 X |

WILLIAM W. DYER, Jr., *Primary Examiner.*

W. D. BRAY, *Assistant Examiner.*